United States Patent
Haselden et al.

(10) Patent No.: US 7,603,363 B2
(45) Date of Patent: Oct. 13, 2009

(54) SYSTEMS AND METHODS FOR CONTROLLING TRANSACTION PARTICIPATION FOR GROUPS OF STEPS IN A WORKFLOW

(75) Inventors: J Kirk Haselden, Sammamish, WA (US); James K Howey, Seattle, WA (US); Sergei Ivanov, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 188 days.

(21) Appl. No.: 11/030,039

(22) Filed: Jan. 5, 2005

(65) Prior Publication Data

US 2006/0149698 A1    Jul. 6, 2006

(51) Int. Cl.
*G06F 17/30* (2006.01)
(52) U.S. Cl. .......................... 707/100; 707/1; 707/201; 705/1; 705/9
(58) Field of Classification Search ........................ None
See application file for complete search history.

(56) References Cited

U.S. PATENT DOCUMENTS

| | | | | |
|---|---|---|---|---|
| 5,414,840 A | * | 5/1995 | Rengarajan et al. | 707/201 |
| 5,761,731 A | * | 6/1998 | Van Doren et al. | 711/155 |
| 5,764,897 A | * | 6/1998 | Khalidi | 709/201 |
| 5,958,004 A | * | 9/1999 | Helland et al. | 718/101 |
| 5,987,552 A | * | 11/1999 | Chittor et al. | 710/310 |
| 6,012,094 A | * | 1/2000 | Leymann et al. | 709/230 |
| 6,061,764 A | * | 5/2000 | Chittor et al. | 711/141 |
| 6,138,169 A | * | 10/2000 | Freund et al. | 719/313 |
| 6,898,608 B2 | * | 5/2005 | Hopeman et al. | 707/202 |
| 6,934,755 B1 | * | 8/2005 | Saulpaugh et al. | 709/226 |
| 6,957,237 B1 | * | 10/2005 | Traversat et al. | 707/206 |
| 2002/0087366 A1 | * | 7/2002 | Collier et al. | 705/5 |
| 2003/0204534 A1 | * | 10/2003 | Hopeman et al. | 707/200 |
| 2006/0004882 A1 | * | 1/2006 | Itikarlapalli et al. | 707/201 |
| 2006/0095659 A1 | * | 5/2006 | New et al. | 711/112 |

OTHER PUBLICATIONS

"*DTS Transaction Fundamentals*", http://msdn.microsoft.com/library/en-us/dtssql/dts_addf_tx_660j.asp?frame=true, 2 pgs.

* cited by examiner

*Primary Examiner*—Truong Cam Y
*Assistant Examiner*—Shyue Jiunn Hwa
(74) *Attorney, Agent, or Firm*—Woodcock Washburn LLP (57) ABSTRACT

Systems, methods, and computer readable media for designing and executing workflows can be equipped with a means for manipulation of workflow steps by grouping them, such as by placing them in containers. A container can be associated with a database transaction. In some embodiments, a container property can be set to indicate whether the container must participate, may participate, or may not participate in a database transaction. Further, containers may be placed in parent containers, and optionally inherit the transaction property of the parent.

20 Claims, 7 Drawing Sheets

SYSTEMS AND METHODS FOR CONTROLLING TRANSACTION PARTICIPATION FOR GROUPS OF STEPS IN A WORKFLOW

FIELD OF THE INVENTION

The invention relates to designing and executing computer software, and more particularly design and execution of workflows that retrieve and update data stored in databases, and more particularly to design and execution of workflows that execute in the context of one or more database transactions.

BACKGROUND OF THE INVENTION

"Transactions" are a feature offered by most modem enterprise-class databases to ensure data integrity is maintained when data is modified. Maintaining data integrity protects the quality of the data that organizations rely upon. When organizations generate reports, for example, when a bank generates an online account summary, or engages in any other data-driven procedure, they want to know that the information they are working with is correct and is not subject to damage due to failure of any parts of the system, either hardware or software.

Database transactions are said to have "ACID" properties:

Atomic—All statements in a transaction either complete successfully, or they are all rolled back. The task that the set of operations represents is either accomplished or not, but more importantly it is not left half-done, to the detriment of data integrity.

Consistent—All data touched by the transaction is left in a logically consistent state. For example, if inventory numbers were decremented in one table, there has to be a related order that consumed that inventory. The inventory can't just disappear.

Isolated—The transaction must affect data without interfering with other concurrent transactions, or being interfered with by them. This prevents transactions from making changes to data based on uncommitted information, for example changes to a record that are subsequently rolled back. Most databases use locking to maintain transaction isolation.

Durable—The data changes enacted by the transaction are permanent, and will persist through a system failure.

One classic example for demonstrating the need for transactions is submitting an order to an order entry system. Consider a company that wishes to check a customer's credit level, create an order record, create order line item records, decrement the order items from inventory, create a ship request, and any number additional related steps. If one or more of those steps fail but the rest succeed, the company can end up with inconsistent data in the form of orphaned records, unreliable inventory numbers, and so forth. Using transactions appropriately prevents this from occurring.

Note that the steps in the above example can be described as a workflow. A number of discrete workflow tasks, or steps, may each contribute to the workflow. Some of the steps may generate data that will be used to update a database, while other steps may simply perform temporarily needed functions. The question arises, especially for longer workflows, which steps should be included in a transaction? More specifically, which of the steps should either commit or be rolled back as a group? At present, workflow design and execution software is not arranged to easily delineate the transactional grouping of workflow steps. While individual workflow steps can be associated, one-by-one, with a particular transaction, this leaves workflow designers no easy way to visualize and understand the relationships between the steps in a workflow vis-á-vis involvement in database transactions.

SUMMARY OF THE INVENTION

In view of the foregoing, the present invention provides systems, methods, and computer readable media for designing and executing workflows. The design of a workflow may be computer assisted through a Graphical User Interface (GUI). A GUI may provide graphical representations of various workflow steps, and allow manipulation of the steps by grouping them, such as by placing them in containers. A container can be associated with a database transaction. In some embodiments, a container property can be set to indicate whether the container must participate, may participate, or may not participate in a database transaction. Further, containers may be placed in parent containers, and optionally inherit the transaction property of the parent. If a container transaction property indicates that the container may not participate, then the workflow steps in the container may not be tied to a transaction. If the transaction property indicates that the container may participate, then the container can inherit any transaction properties of a parent container, or remain unassociated with a transaction if there is no parent transaction property. If the transaction property indicates that the container must participate, then the container can start a new transaction if no transaction is inherited from a parent. Further aspects and embodiments are set forth below.

BRIEF DESCRIPTION OF THE DRAWINGS

The systems and methods for controlling transaction participation in accordance with the present invention are further described with reference to the accompanying drawings in which.

DETAILED DESCRIPTION OF ILLUSTRATIVE EMBODIMENTS

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to sequences in the following disclosure, any sequences in the description and claims are for providing a clear explanation, and should not be taken as required to practice this invention.

One powerful advantage of the invention is that it facilitates workflow design. It accomplishes this by allowing a user of computer software embodying the invention to select a plurality of workflow steps, associate the steps with a container, and then define the database transaction properties of the container. The design can be validated to ensure that transaction properties have been appropriately defined. Validation can also ensure that workflow steps within the container utilize resources that are capable of participating in a transaction. If the resources being utilized are not capable of participating in a transaction, this error can be reported while the workflow package is being designed, thereby reducing execution-time errors. Workflow execution engines can be configured to properly execute workflows designed in this manner. There are other aspects of the invention that will be explained below.

To clearly point out the details of the invention, this detailed description will first describe a computer and computer software, and define workflows as a particular type of computer software. Next, the use of containers to organize workflow steps will be explained, including how "parent" containers may include "child" containers, and how properties may be associated with a container. In various embodiments, one type of property, referred to as a "TransactionOption" property, may be associated with containers. At this juncture, connection objects with which the steps of a workflow may communicate are also defined.

Having described workflows, containers, container properties, and connection objects, this description will go on to explain database transactions. A description of what it means to commit or roll back the outputs of workflow steps in a container pursuant to a database transaction will be provided. Next, embodiments of the invention are set forth in which a container property, referred to here as a TransactionOption property, is set to indicate that database transactions are "Supported," "Not Supported," or "Required." The implications of these three property settings are explained. The use of the settings by a workflow execution engine to carry out the workflow designer's intentions is also explained. Finally, an additional consideration and aspect of the invention that provides increased user control over which connection objects may and may not participate in a transaction is described.

Exemplary Computing Device

Figure 1:
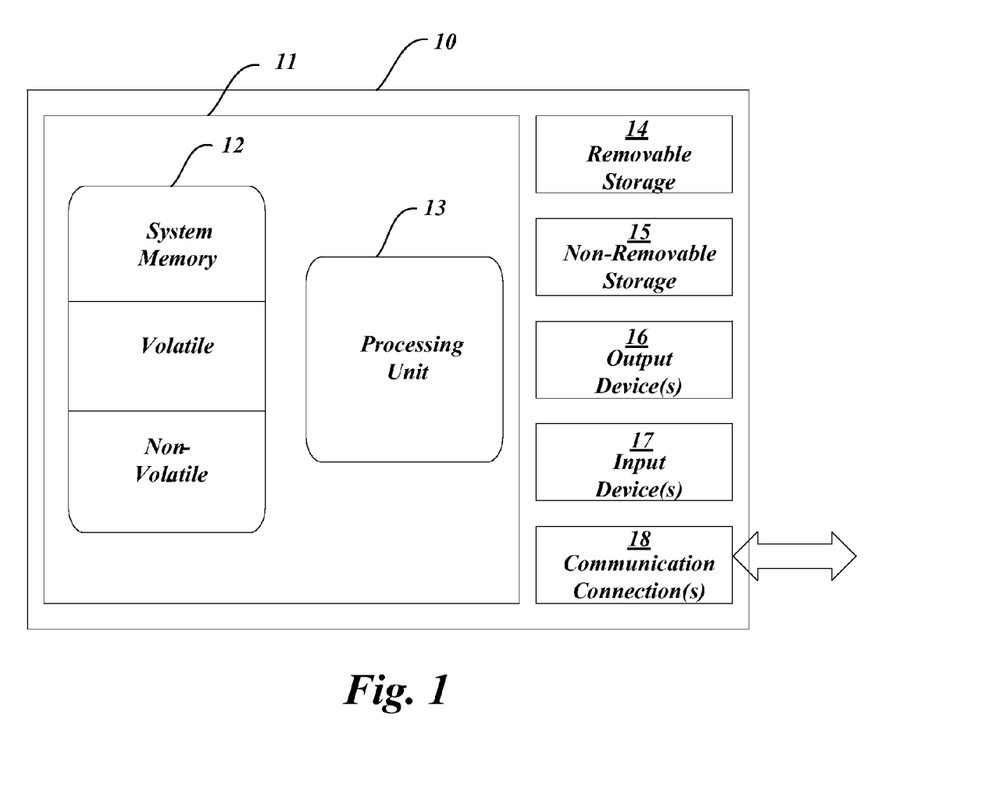
FIG. 1 illustrates some basic components of a computer for that store functional components of the invention and execute instructions for carrying out the methods described herein.

With reference to FIG. 1, an exemplary system for implementing the invention includes a computing device, such as computing device 10. In its most basic configuration, computing device 10 typically includes at least one processing unit 13 and memory 12. Memory 12 is one example of computer readable media, but computer readable media as that term is used here can be any media that can be accessed by 10. Depending on the exact configuration and type of computing device, computer readable media such as memory 12 may be volatile (such as RAM), non-volatile (such as ROM, flash memory, etc.) or some combination of the two.

Device 10 may also have additional features/functionality. For example, device 10 may also include additional storage (removable 14 and/or non-removable 15) including, but not limited to, magnetic or optical disks or tape. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 10. Any such computer storage media may be part of device 10.

Device 10 may also contain communications connection(s) 18 that allow the device 10 to communicate with other devices. Communications connection(s) 18 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 10 may also have input device(s) 17 such as keyboard, mouse, pen, voice input device, touch input device, etc. Output device(s) 16 such as a display, speakers, printer, etc. may also be included. All these devices are well known in the art and need not be discussed at length here, however, a brief additional description of a Graphical User Interface (GUI) may be useful. A GUI in accordance with embodiments of the invention is illustrated in FIG. 2.

Figure 2:
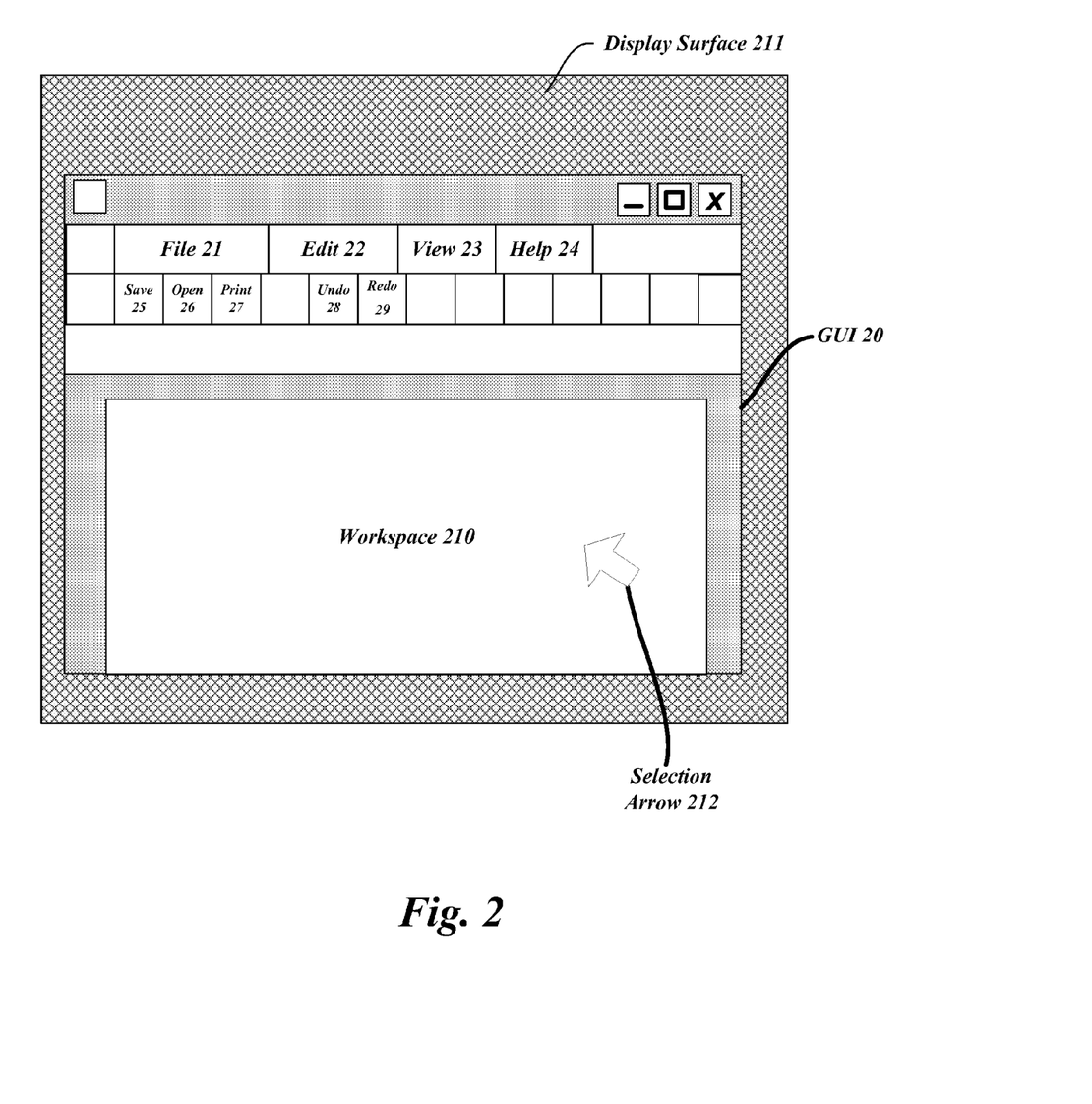
FIG. 2 illustrates a Graphical User Interface (GUI) as it may appear on a display such as a computer screen, and which may bear elements that allow a user to perform actions associated with the invention as well as trigger program functions that are considered part of the invention.

FIG. 2 illustrates a display surface 211, such a computer screen, with a GUI 20 displayed thereon. A GUI 20 typically comprises a plurality of selectable elements, for example 21-29, which may activate certain software program functions. In the case of menu elements 21-24, drop-down lists of program functions may be displayed. The GUI workspace 210 typically displays a file which can be modified by a user. The user may modify a file in the workspace 210 using a selection device such as a mouse (not shown), which moves a cursor, such as selection arrow 212 to a desired location in the workspace 210 or among the selectable elements 21-29. A data input device such as a keyboard (not shown) may be used to enter data at a desired location in a file open in the workspace 210. Additional properties of files displayed in a workspace 210 may be added, removed, or modified by selecting among the available functions exposed through the selectable elements 21-29.

Aspects of the invention may be described in the general context of computer-executable instructions, i.e. software, that runs on the computing device of FIG. 1. Such software is often in the form of program modules. Generally, program modules include routines, programs, objects, components, data structures, etc. that perform particular tasks or implement particular abstract data types. Typically the functionality of the program modules may be combined or distributed as desired in various embodiments. The field of software design is marked by rapid evolution, and the invention is not limited to any programming language or structure of the instruction sets that carry out software functions. Moreover, software functions and hardware functions are considered to be interchangeable in modern computing. Functionality performed by a hardware device may be embodied in software and vice-versa.

Exemplary Workflows, Containers, and Connection Objects

Figure 3:
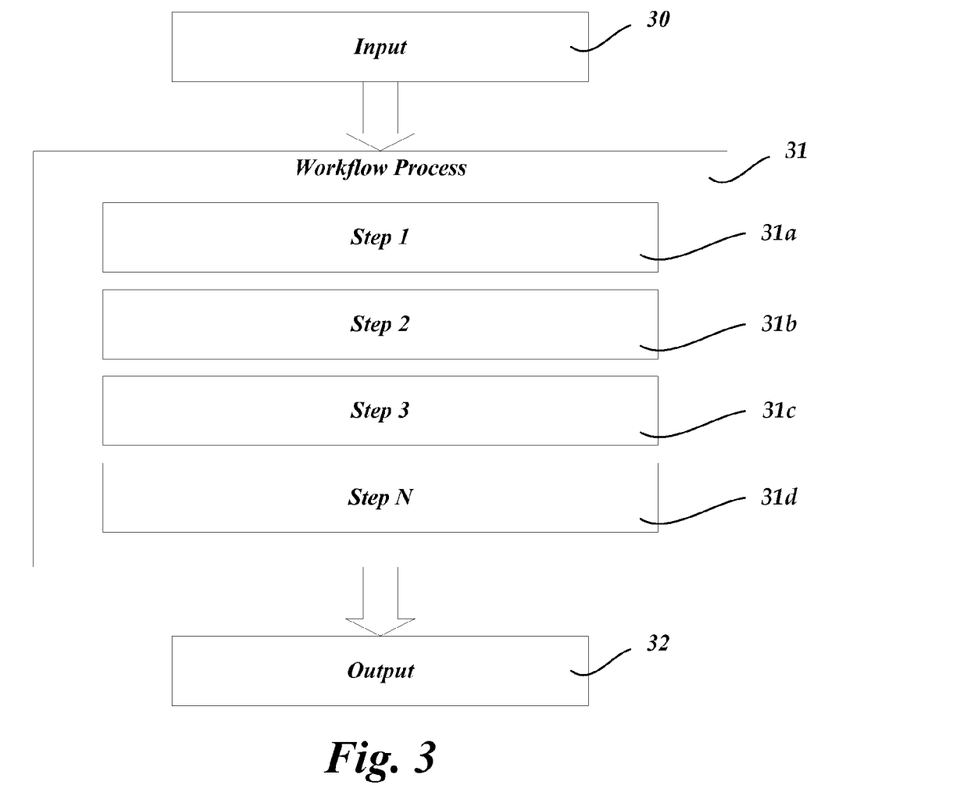
FIG. 3 shows a workflow in which a plurality of steps work together on one or more inputs to produce one or more outputs.

FIG. 3 illustrates a workflow process 31. An initial input 30 is fed to the workflow process 31 where the input is processed by a plurality of steps 31a-31d. In some workflow software, steps are referred to as tasks. For the purpose of this specification, the term step and the term task are used interchangeably, but step will be used as consistently as possible for clarity.

Each step typically, though not necessarily, takes some input and produces some output, which may be processed further by a subsequent step. For example, in FIG. 3, an input from 30 is passed to workflow process 31, where the input 30 is first processed by Step 1 31a. Step 1 31a performs an operation on the input 30 and generates some output. The output may be passed directly to a subsequent step or stored in memory. The output may be stored, for example, as unstructured text and/or hard coded file locations on a disk. This model of a workflow may be referred to as a dataflow, in which data is modified and intermediately stored by various steps.

This output may then be located by another step in the workflow, e.g., Step 2 31b. Step 2 31b may perform a subsequent operation. Exemplary step 2 31b first accesses the output passed to it or stored by Step 1 31a. Step 2 31b then changes the output in some way, and passes the results to a subsequent step or stores the output in memory. This process can be repeated by the additional steps 31c-31d until one or more final outputs are produced, and placed for example in output 32. The final output 32 can be stored, just like any intermediary outputs, in particular location(s) in memory and with identification(s) such as one or more file names.

Figure 4:
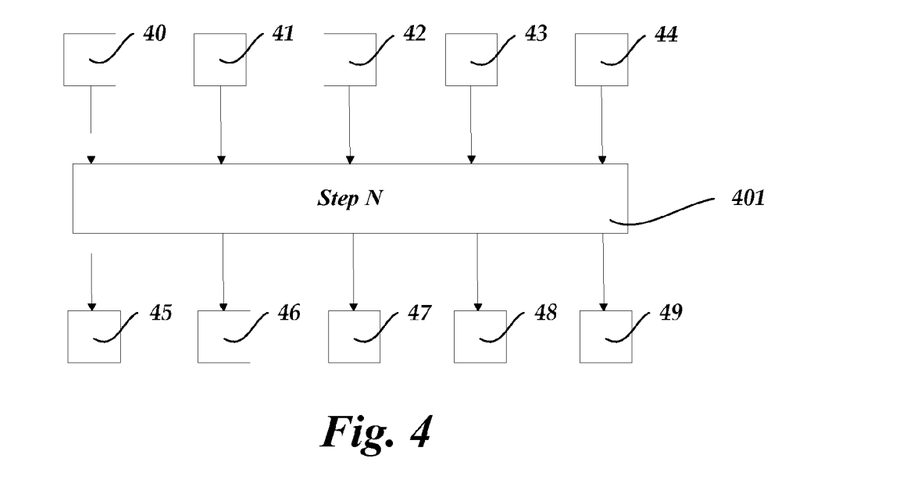
FIG. 4 illustrates a more realistic view of a step in a modem workflow, in which inputs may come from a plurality of sources, and outputs may be stored or delivered to a plurality of subsequent locations.

The illustration of FIG. 3 is greatly simplified from the reality of most modern workflows, and FIG. 4 is designed to give a more realistic illustration. In general, steps 31a-31d from FIG. 3 will not simply take up the output, or the status, of a previous step in a linear way. Some steps operate on initial inputs/status from 30, while other steps work on intermediate outputs/status from steps in the workflow. Commonly, a step such as step N 401 in FIG. 4 may process diverse inputs/status, such as data inputs/status from a database, e.g. 40, data entered by a user, e.g. 41, and/or outputs/status from a variety of previous steps, e.g. 42, 43, and 44. The outputs/status from a step 401 may be final outputs/status that are not subsequently modified by subsequent steps in a workflow, e.g. 45 and 46, or may be outputs/status, e.g. 47, 48, and 49 that are processed further by a variety of subsequent workflow steps.

Thus, initial input/status into a workflow process may not advance linearly from step to step, but will typically enter a workflow at various locations, and be passed from step to step in a complex web of workflow processing.

Moreover, a workflow may transmit only a status, and no data, from step to step. Such embodiments do not use any intermediate storage. One of the steps that may be placed in a workflow is the data flow step. Within this step sources and transforms and destinations may be used. So it may be the case that a step places data in intermediate storage, via a data flow task, that is not a necessary condition for a work flow. Tasks in workflow could be completely independent, and could do non-data-centric operations, such as sending mail.

Figure 5:
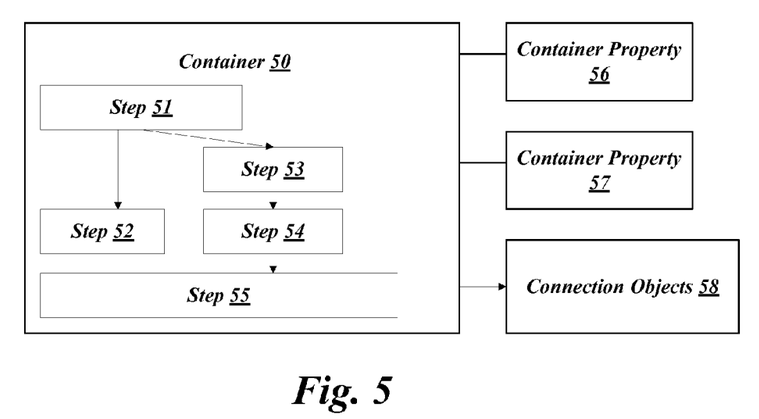
FIG. 5 shows a workflow container. A plurality of steps maybe placed in a container, and properties can be set for the container.

In accordance with various embodiments of the invention, steps in a workflow may be graphically represented in a GUI workspace for designing workflows. Each step may be represented, for example, by a square, a circle, a line of text, an image, or other recognizable graphic representation. FIG. 5 provides an illustration of an exemplary appearance for a plurality of steps 51-55 within a container 50, as those items may appear in the GUI of workflow design software that incorporates aspects of the invention. In workflow design software, workflow steps can be added, removed, and modified from a GUI by selecting a workflow step, e.g. step 51, and accessing program functions (not illustrated in FIG. 5) that automatically make changes to the step 51 or expose representations of underlying data to assist the user in making such modifications manually.

Furthermore, the relationships between steps can be controlled from the GUI of workflow design software. In this regard, a first step, e.g. 51 may perform a first task that is followed by another step, e.g. 52, or by a plurality of subsequent steps, e.g. any combination of 53, 54, and 55. Following the first step, e.g. 51, a control may be passed to another step, e.g. 52. The completion of the first step might enable the commencement of several subsequent operations, e.g. 54 and 55. The use of containers such as 50 is a way to specify properties for groups of steps 51-55 in a workflow or to otherwise perform actions that affect a group of workflow steps. A container 50 may be graphically represented, for example, as an empty box, as in FIG. 5, or other empty shape in a workflow design GUI.

A container 50 can be represented at the level of software instructions in a variety of ways that are known in the art. Any instructions that allow certain properties or actions to be applied to the steps within the container 50 are considered to be within the scope of the invention. Workflow steps 51-55 that are placed in a container 50 can be subject to the properties 56, 57 defined for that container 50. These properties 56, 57 may also be displayed graphically in a GUI representation of a workflow. For example, within container 50, references to dates made by steps 51-55 may be treated as in France, with the day of the month preceding the month number. Similarly, a property 56 might specify that the container 50 will operate only on data from certain databases. The steps 51-56 may be limited in this way to operate only on data from the desired databases.

Note that a "group of steps" as that phrase is used here, can be one or more workflow steps. A single step could be placed in a container. In this case, the properties of the container, or other actions specified for the container, would simply be applied to that single step. For example, in some embodiments of the invention, one or more steps may be placed in a container, and a container property may be set that provides any database transaction property for that container. While some particularly useful properties are discussed below, the invention is not limited to the nuances of how transaction properties are set for a container.

Just as properties 56, 57 maybe set for a container 50, a container or the steps 51-55 within a container may be set to communicate with one or more connection objects 58. A connection object is any software object in object-oriented programming that communicates with a step 51-55 or container 50 in a workflow. Typically, a connection object 58 may reside at a remote location such as at a server that is located across a network connection. The connection object itself, the data referred to by the connection object, or both may reside remotely. The connection object may provide a step 51 or a container 50 in a workflow with the data that the step 51 or container 50 needs to proceed with an operation. Connection objects 58 may be graphically represented in a GUI as shown in FIG. 5.

Figure 6:
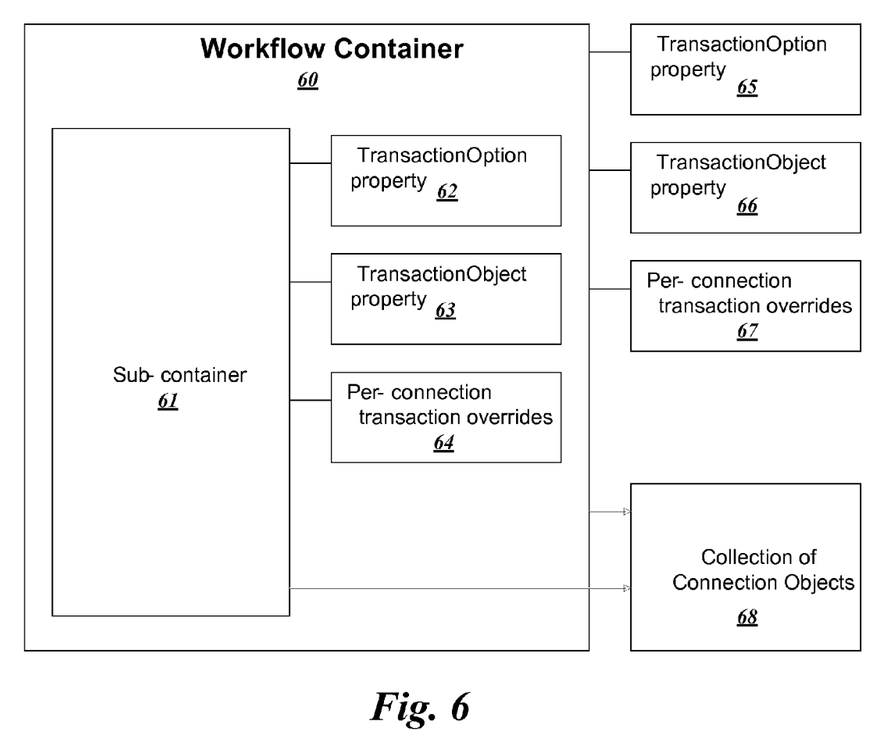
FIG. 6 shows a parent and child container, each bearing properties that may be associated with containers in embodiments of the invention.

FIG. 6 provides an illustration of a container that embodies various aspects of the invention. FIG. 6 illustrates, first, the concept of parent and child containers. Second, FIG. 6 provides several container properties, e.g. 65, 66, and 67 that may be used with containers and that will be described in greater detail below.

A parent container 60 is a container that includes one or more sub-containers 61. Sub-containers are also referred to herein as child containers. A child container 61 is a container that resides within one or more parent containers 60. Parent and child containers may be graphically represented in workflow design software GUIs as in FIG. 6. Other means of indicating which are parent and child containers, such as through the use of the familiar tree diagram used by popular products such as WINDOWS EXPLORER®, or color, text identification, display position, shape, and so on, are also available. The properties of a parent container, such as TransactionOption property 65 may apply to any workflow steps in a child container 61. The properties of a child container, such as TransactionOption property 62 need not apply to steps that may be in other child containers (not shown) that reside in parent container 60. Thus the use of containers allows for organization of workflows by dividing the steps into logical units which may have some properties in common. The use of parent and child containers allows for additional organization of the logical units within a parent container.

As illustrated in FIG. 6, embodiments of the invention may make use of container properties 65, 66, and 67. These same properties may be defined on parent container 60 as well as any child containers 61. The property 65 can be used at design time to control whether the steps in a container participate in a database transaction. Prior to a discussion of the manner in which embodiments of the invention may use these properties 65, 66, 67 to control the transaction participation of a container 60, however, a brief description of a database transaction is provided below.

Exemplary Database Transactions

Transactions, as described in the background section, are a feature offered by most modern enterprise-class databases to ensure data integrity is maintained when data is modified. Maintaining data integrity protects the quality of the data that organizations rely upon. When organizations generate reports, for example, when a bank generates an online account summary, or engages in any other data-driven procedure, they want to know that the information they are working with is correct.

Figure 7:
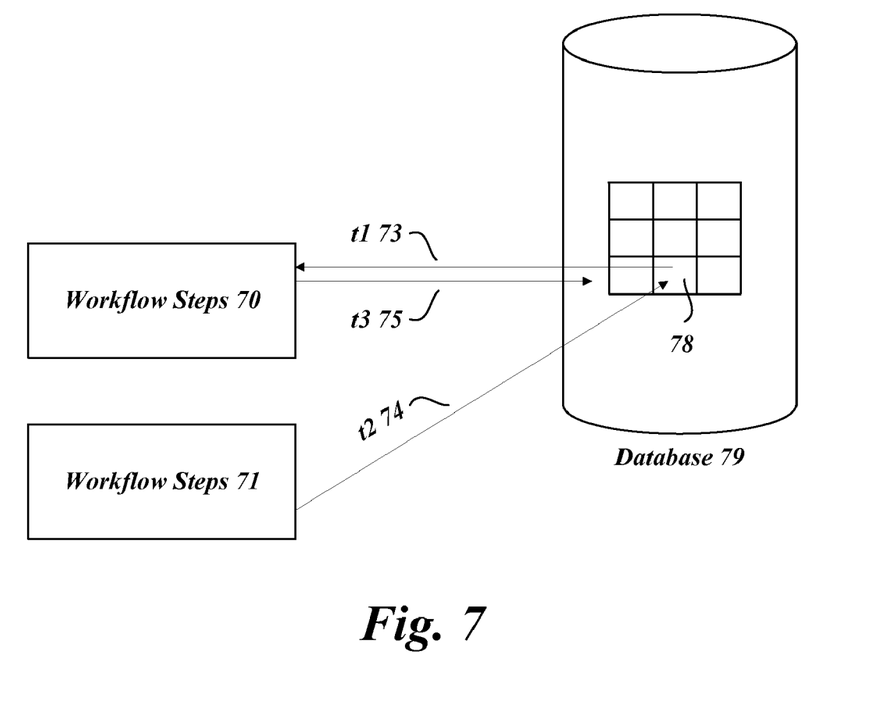
FIG. 7 illustrates the problem that database transactions address. Data integrity can be corrupted if more than one process, such as the illustrated workflow processes, are allowed to access and update data simultaneously.

Transactions can best be understood by reference to the problem that they address. An example of the problem that database transactions address is depicted in FIG. 7. As shown, multiple processes, such as workflow 70 and workflow 71 may attempt to operate on data in a database 79 at various times, e.g. t1 73, t2 74, and t3 75. The operations may include both reading the data in database 79 as well as writing or updating the data.

For the purpose of this example, two processes 70 and 71 are accessing the same data record 78 in a database 79. The first process 70 reads the record 78 at time t1 73, and begins a calculation based on the record 78 as it is at time t1 73. For example, the first process 70 reads a bank account balance stored in 78 at time t1 73. Process 70 may be a deposit process that adds money deposited to the account balance stored in 78.

Next, a second process 71 updates the record 78, at time t2 74. For example, process 71 may be another deposit process that adds money deposited to the account balance stored in 78. Deposit process 71 may have read the account balance stored in 78 previously. Process 71 may add money to the account, to the account balance is more than what it was at time t1 73.

Finally, the first process 70 attempts to update the record 78 at time t3 75. If this were permitted to occur, it may result in an erroneous account balance stored in 78, because the first process 70 used the balance at time t1 73 rather than at time t2 74. The first process 70 may store an account balance in 78 that is too low, and does not reflect the deposit processed by process 71.

Transactions are a database feature that address the above problem. Typically, transactions provide a set of database operations that are either "committed" or "rolled back" together. Thus, if the first process 70 from FIG. 7 does not commit, because it is discovered that underlying data in 78 has changed during the calculations, then all operations associated with the process 70 can be rolled back and repeated if necessary. The term "rolled back" and the term "aborted" are used interchangeably here. A workflow that is rolled back may also be described as a workflow that is aborted. Any number of underlying processes may be associated with the implementation of a transaction feature, and the invention is not limited to a particular method or system for implementing transactions. Database transactions are said to have "ACID" properties:

Atomic—All statements in a transaction either complete successfully, or they are all rolled back. The task that the set of operations represents is either accomplished or not, but more importantly it is not left half-done, to the detriment of data integrity.

Consistent—All data touched by the transaction is left in a logically consistent state. For example, if inventory numbers were decremented in one table, there has to be a related order that consumed that inventory. The inventory can't just disappear.

Isolated—The transaction must affect data without interfering with other concurrent transactions, or being interfered with by them. This prevents transactions from making changes to data based on uncommitted information, for example changes to a record that are subsequently rolled back. Most databases use locking to maintain transaction isolation.

Durable—The data changes enacted by the transaction are permanent, and will persist through a system failure.

While most transactions pass the ACID test, the transactions described herein need not pass the ACID test unless specified. At the most basic level, transactions are atomic. Therefore the only identifying feature for transactions, as that term is used here, is that transactions are atomic. Otherwise transactions may include any number of additional features and assurances.

A transaction typically consists of two steps-Begin, and then either Commit or Rollback. The Begin call defines the start of the transaction boundary, and the call to either Commit or Rollback defines the end of it. Within the transaction boundary, all of the statements executed are considered to be part of a unit for accomplishing the given task, and must succeed or fail as one. Commit (as the name suggests) commits the data modifications if everything was successful, and Rollback undoes the data modifications if an error occurs. Most NET data providers provide similar classes and methods to accomplish these operations.

Isolation levels are used by transactions to determine how restrictive the transaction is in regards to its isolation behavior. The more restrictive the isolation level, the more stringently the data affected by the transaction is isolated from other transactions. Most databases enforce isolation by means of locking; you should double-check what method your targeted DBMS uses. The tradeoff is between performance and concurrency—the more locks the system has to maintain, the more likely it is that there will be conflicts and slowdowns as different processes try to access the same resources.

Exemplary Container Properties

For the purpose of this explanation, return to FIG. 6 and consider child container 61 and the properties defined on that container, namely 62, 63, and 64. Such properties may be associated with a workflow container either "manually" by defining the properties on the container from the GUI of workflow design software, or "automatically" such as by a workflow design program that may assign default values for the property settings at the time a container 61 is created. In embodiments where the TransactionOption property 62 is set "manually" by a user, the user can flexibly control whether a corresponding workflow container 61 participates in a database transaction Various embodiments of the TransactionOption property 62 may be set to the following values: NotSupported, Supported, and Required. The invention is not limited to the particular names of these values; embodiments may replace the above with any names. A properly configured workflow execution engine ("engine") can then apply these settings to determine whether the associated workflow container participates in a database transaction. When an engine schedules a container for execution, the engine may examine the TransactionOption property and adhere to the following heuristics (note that the following example assumes the TransactionObject property 66 is initially null):

If TransactionOption is NotSupported, workflow container's TransactionObject is left null.

If TransactionOption is Supported, workflow container's TransactionObject is assigned the value of parent workflow container's transaction object.

If TransactionOption is Required, workflow container's TransactionObject is assigned the value of parent workflow container's transaction object, unless it is null, in which case it is a assigned a newly created transaction.

This procedure results in an appropriate transaction context being available to each container at execution according to the user-specified value of the TransactionOption property. An illustration of steps as set forth above that may be performed by an exemplary engine is provided in FIG. 8. First, an engine or portion thereof which handles the setting of container transaction properties, can start with a particular container 80. The process in FIG. 8 may be repeated as necessary for all the containers in a workflow. The engine may determine whether the TransactionOption property contains the "not supported" value 81. If not, the engine may determine whether the TransactionOption property contains the "supported" value 83. If not, the engine can determine whether the transaction property contains the "required" value.

Figure 8:
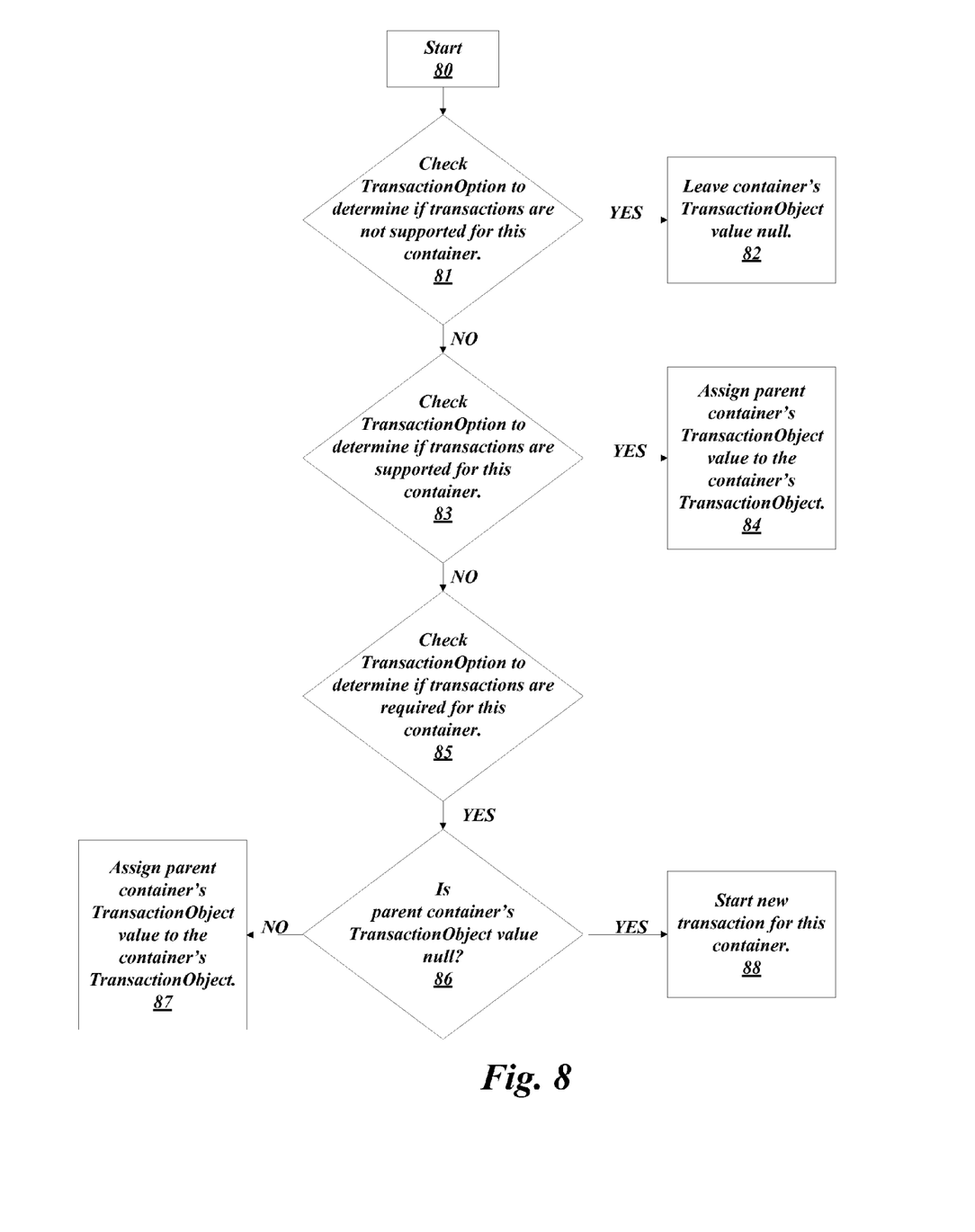
FIG. 8 illustrates a flowchart for an exemplary workflow execution engine process capable of setting appropriate transaction participation properties for containers that declare their transactional participation in accordance with various embodiments of the invention.

If it is determined that the TransactionOption is not supported, then the engine may proceed to leave the value of the container's TransactionObject null 82. The steps of the container will not be associated with a transaction, and will be restricted to execute in an atomic fashion or otherwise in the context of a transaction.

If it is determined that the TransactionOption is supported, then the engine may proceed to assign the value of a parent container's transaction object (if in fact there is a parent container) to the container that is being operated on, such as in process 84. Thus, if there is no parent container, then the value of the container's TransactionObject may be left null, and the steps of the container may not be associated with a transaction. Likewise if there is a parent container, but the parent container's TransactionObject is null 82, this may result in the steps of the container not being associated with a transaction. If there is a parent container, however, and the parent container is associated with a transaction, then that will be reflected in the parent container's transaction object, and the child container will become associated with the same transaction because the child's TransactionOption property was set to supported.

Finally, if it is determined that the TransactionOption is required, then the engine may proceed to process 86, and further determine whether or not a parent container's TransactionObject is null. If so, then the engine may proceed to process 88, and assign a new transaction to the container's TransactionObject. If not, then the container may be assigned the value of the parent's TransactionObject, in process 87.

When the transactional participation of containers has been determined, the workflow engine can execute the workflow and honor the participation settings. Thus, when last member (i.e. task or step) in a container executes, the container may provide a process that evaluates if the execution of the steps therein, as a whole, was a success or a failure. Criteria for this determination may be determined by the creator of the container, and need not require that every step in the container executed successfully. If the evaluation determines both that the execution of the container as a whole was a success and that the transaction with which the container is associated was initiated by the container, i.e. not inherited, then the output for the container can commit. If the execution of the container was a success (or a failure), but the transaction was initiated by a parent container, then the commit can be delayed until an evaluation for the parent container determines to commit.

In summary, a user may use a container property to specify whether transactions for a particular container are not supported, supported, or required. A workflow execution engine may utilize the user's settings to execute the workflow with the desired transaction restrictions. If transactions are not supported for a particular container, the engine can omit the steps in that container from any transaction. If transactions are supported, but not required, then the engine can assign the container to execute in the context of a transaction started for a parent container, if there is such a transaction. If transactions are required, the engine may ensure that the container participates in a transaction, either by including it in a parent container's transaction or by starting a new transaction.

Figure 9:
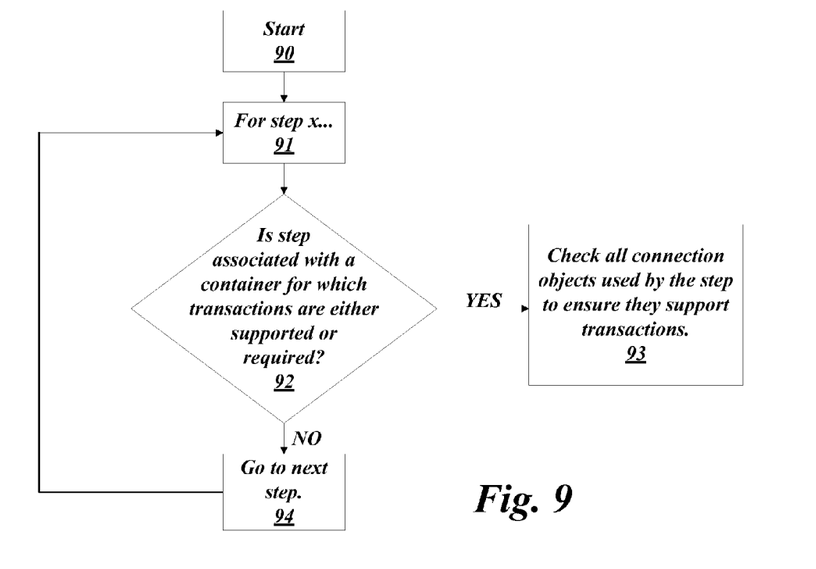
FIG. 9 illustrates an exemplary validation process whereby the transactional capabilities of connection objects can be verified to ensure that any connection objects that must support transactions will in fact support transactions.

The above design, as well as any other implementations which may use other properties defined on containers to organize their participation in transactions, may be accompanied by a design-time validation process. Such a process is illustrated in FIG. 9. A design-time validation process is useful, because, for example, a user may mistakenly set a container's TransactionOption property to "Required" when not all of the connection objects used by the container support transactions. In this scenario, the user may want to know of this prior to attempting to execute the workflow. A validation process such as that of FIG. 9 may analyze each task, or step, in a workflow. In this regard, it may start 90, then pick up a first step in a workflow 91, and determine whether the step is associated with a container for which transactions are either supported or required 92. If so, the validation process may ensure that all connection objects used by the step also support transactions 93. If not, then various embodiments may presume that the step is associated with a container for which transactions are not supported, and therefore need not check the transactional capabilities of the connection objects used by the step. The process may go through all the steps in a workflow, as reflected in 94. Note that in order to perform the operation described here, connection objects may be configured to declare their transactional capabilities.

Figure 10:
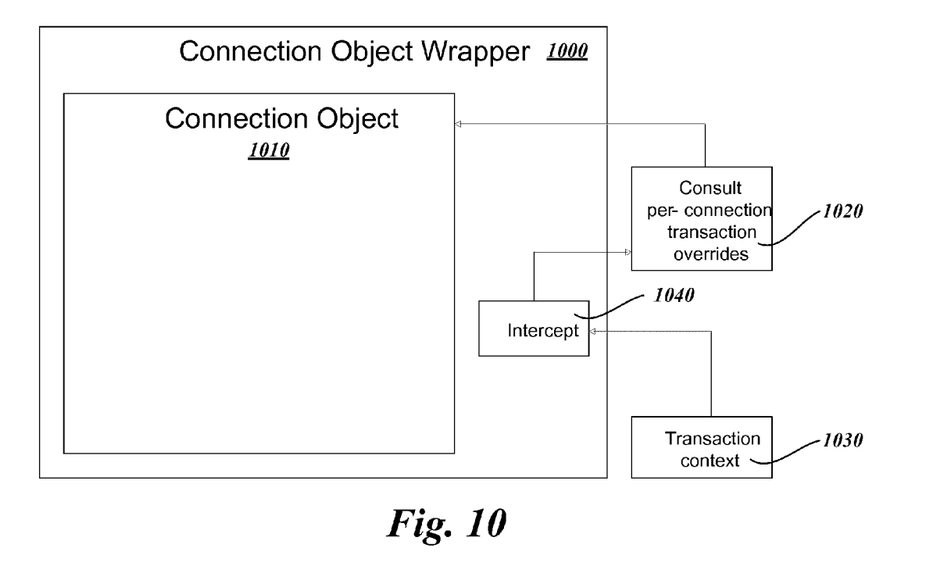
FIG. 10 illustrates a connection object wrapper that may be created by a workflow execution engine in various embodiments of the invention to implement per-connection transaction overrides.

During execution of the engine, a container may use a transaction directly or pass a transaction context through to connection objects. A secondary problem exists that may also be addressed in various embodiments of the invention. Refer to FIG. 10. For a container object that uses several connection objects, it is possible that not all connections are operated on in a fashion that requires ACID behavior. Whether it is so is highly situation-dependent and is therefore best determined by the user. The user therefore may need the ability to designate that certain connection objects must not participate in a transaction. Participation in a transaction for operations that do not require ACID properties results in overhead and unnecessary adverse impact on system performance. The invention can address the need for user control over connection objects' participation in transactions in a transparent fashion that need not require special logic to be built in the connection objects themselves or in the workflow containers themselves.

In this regard, workflow containers may pass on the value of their TransactionObject properties to any connection objects used by the container(s), as depicted in FIG. 10. Connection object(s) such as 1010 may, in turn, use the passed in transaction context 1030 to participate in the transaction. The workflow execution engine, however, can place connection objects, such as 1010 inside a wrapper object 1000, which intercepts the invocation of the connection object 1010, for example, by using an intercept function 1040, and may null transaction context if the engine determines that the user has indicated in some fashion that the particular connection object 1010 should not participate in the transaction. The user may store a set of per-connection transaction overrides 1020, which may be consulted by the engine to make the determination.

Finally, it should be understood that the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the user interface techniques of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments refer to utilizing the present invention in the context of one or more stand-alone computer systems, the invention is not so limited, but rather may be implemented in connection with any computing environment, such as a network or distributed computing environment. Still further, the present invention may be implemented in or across a plurality of processing chips or devices, and storage may similarly be effected across a plurality of devices. Such devices might include personal computers, network servers, supercomputers, and so forth. Therefore, the present invention should not be limited to any single embodiment, but rather should be construed in breadth and scope in accordance with the appended claims.

What is claimed:

1. A method for controlling transactional properties of a plurality of steps in a workflow through a Graphical User Interface (GUI) that presents graphical representations of the plurality of steps in a processor, the method comprising:

selecting, by using the processor, a plurality of workflow steps;

associating the plurality of workflow steps with a container, wherein at least one property is defined for the container;

setting the at least one property of the container to indicate a level of participation of the plurality of workflow steps of the container in an atomic transaction, wherein the atomic transaction requires that the plurality of workflow steps participating in a transaction either all commit changes to a resource or all roll back any changes to the resource, and wherein the setting the at least one property comprises saving data identifying said at least one property;

associating a first transaction object with the container, wherein a value of the first transaction object is initially set to null;

associating the container with a parent container, the parent container being associated with a superset of workflow steps including the selected plurality of workflow steps and additional work flow steps related to the selected plurality of workflow steps and being associated with a second transaction object;

assigning a value of the second transaction object to the value of the first transaction object if the at least one property is set to indicate that the container participate in the atomic transaction, the assigned value representing that the superset of workflow steps including the plurality of workflow steps of the container of the first transaction object and the additional workflow steps of the parent container of the second transaction object are to be performed as the atomic transaction;

leaving the value of the first transaction object set to null if the at least one property is set to indicate that the container is not allowed to participate in the atomic transaction, the null value representing that the plurality of workflow steps of the container of the first transaction object and the additional workflow steps of the parent container of the second transaction object are to be performed as separate transactions;

storing the first transaction object with a first value thereof as assigned or as left null in a computer-readable storage medium;

retrieving the stored first transaction object with the first value thereof as assigned or as left null from the computer-readable storage medium;

employing the value of the retrieved first transaction object to determine whether the plurality of workflow steps of the container of the first transaction object and the additional workflow steps of the parent container of the second transaction object are to be performed as the atomic transaction or as separate transactions;

verifying that a connection object that communicates with one or more of the plurality of workflow steps and the container during execution of the workflow can support the atomic transaction; and assigning the value of the second transaction object to the value of the first transaction object if the at least one property is set to indicate that the container must participate in the atomic transaction and the value of the second transaction object is not null.

2. The method of claim 1 wherein the at least one property is set to indicate that the container may participate in the atomic transaction.

3. The method of claim 2, further comprising assigning the atomic transaction to the container.

4. The method of claim 1 wherein the at least one property is set to indicate that the container must participate in the atomic transaction.

5. The method of claim 4, further comprising assigning the atomic transaction to the container.

6. The method of claim 1, further comprising assigning a new transaction object to the container if (1) the at least one property is set to indicate that the container must participate in the atomic transaction and (2) the value of the second transaction object is null.

7. A system comprising a processor, and a Graphical User Interface (GUI) for defining relationships between a plurality of steps in a workflow and a workflow execution engine for executing the workflow, said system comprising:

memory containing instructions for use in execution by the processor to perform operations including:

selecting a plurality of workflow steps;

associating the plurality of workflow steps with a container, wherein at least one property is defined for the container;

setting the at least one property of the container to indicate a level of participation of the plurality of workflow steps of the container in an atomic transaction, wherein the atomic transaction requires that the plurality of workflow steps participating in a transaction either all commit changes to a resource or all roll back any changes to the resource, and wherein the setting the at least one property comprises saving data identifying said at least one property;

associating a first transaction object with the container, wherein a value of the first transaction object is initially set to null;

associating the container with a parent container, the parent container being associated with a superset of workflow steps including the selected plurality of workflow steps and additional work flow steps related to the selected plurality of workflow steps and being associated with a second transaction object;

assigning a value of the second transaction object to the value of the first transaction object if the at least one property is set to indicate that the container participate in the atomic transaction, the assigned value representing that the superset of workflow steps including the plurality of workflow steps of the container of the first transaction object and the additional workflow steps of the parent container of the second transaction object are to be performed as the atomic transaction;

leaving the value of the first transaction object set to null if the at least one property is set to indicate that the container is not allowed to participate in the atomic transaction, the null value representing that the plurality of workflow steps of the container of the first transaction object and the additional workflow steps of the parent container of the second transaction object are to be performed as separate transactions;

storing the first transaction object with a first value thereof as assigned or as left null in the computer-readable storage medium;

retrieving the stored first transaction object with the first value thereof as assigned or as left null from the computer-readable storage medium;

employing the value of the retrieved first transaction object to determine whether the plurality of workflow steps of the container of the first transaction object and the additional workflow steps of the parent container of the second transaction object are to be performed as the atomic transaction or as separate transactions;

verifying that a connection object that communicates with one or more of the plurality of workflow steps and the container during execution of the workflow can support the atomic transaction; and assigning the value of the second transaction object to the value of the first transaction object if the at least one property is set to indicate that the container must participate in the atomic transaction and the value of the second transaction object is not null.

8. The system of claim 7 wherein the at least one property is set to indicate that the container must participate in the atomic transaction.

9. The system of claim 8, further comprising means for assigning the atomic transaction to the container.

10. The system of claim 9 wherein the atomic transaction that is assigned to the container is a newly created atomic transaction.

11. The system of claim 8, further comprising means for verifying that at least one connection object that one or more of the plurality of workflow steps and the container communicate with during execution of the workflow can support the atomic transaction.

12. The system of claim 7 wherein the at least one property is set to indicate that the container may not participate in the atomic transaction.

13. The system of claim 7, further comprising means for passing an identifier for the atomic transaction to at least one connection object that one or more of the plurality of workflow steps and the container communicate with during execution of the workflow.

14. The system of claim 7, further comprising means for assigning the value of the second transaction object to the value of the first transaction object if (1) the at least one property is set to indicate that the container must participate in the atomic transaction and (2) the value of the second transaction object is not null.

15. The system of claim 7, further comprising means for assigning a new transaction object to the container if (1) the at least one property is set to indicate that the container must participate in the atomic transaction and (2) the value of the second transaction object is null.

16. A computer readable storage medium bearing instructions for controlling the transactional properties of a plurality of steps in a workflow, wherein the instructions perform:

selecting a plurality of workflow steps;

associating the plurality of workflow steps with a container, wherein at least one property is defined for the container;

setting the at least one property of the container to indicate a level of participation of the plurality of workflow steps of the container in an atomic transaction, wherein the atomic transaction requires that the plurality of workflow steps participating in a transaction either all commit changes to a resource or all roll back any changes to the resource, and wherein the setting the at least one property comprises saving data identifying said at least one property;

associating a first transaction object with the container, wherein a value of the first transaction object is initially set to null;

associating the container with a parent container, the parent container being associated with a superset of workflow steps including the selected plurality of workflow steps and additional work flow steps related to the selected plurality of workflow steps and being associated with a second transaction object;

assigning a value of the second transaction object to the value of the first transaction object if the at least one property is set to indicate that the container participate in the atomic transaction, the assigned value representing that the superset of workflow steps including the plurality of workflow steps of the container of the first transaction object and the additional workflow steps of the parent container of the second transaction object are to be performed as the atomic transaction;

leaving the value of the first transaction object set to null if the at least one property is set to indicate that the container is not allowed to participate in the atomic transaction, the null value representing that the plurality of workflow steps of the container of the first transaction object and the additional workflow steps of the parent container of the second transaction object are to be performed as separate transactions;

storing the first transaction object with a first value thereof as assigned or as left null in a computer-readable storage medium;

retrieving the stored first transaction object with the first value thereof as assigned or as left null from the computer-readable storage memory;

employing the value of the retrieved first transaction object to determine whether the plurality of workflow steps of the container of the first transaction object and the additional workflow steps of the parent container of the second transaction object are to be performed as the atomic transaction or as separate transactions;

verifying that a connection object that communicates with one or more of the plurality of workflow steps and the container during execution of the workflow can support the atomic transaction; and assigning the value of the second transaction object to the value of the first transaction object if the at least one property is set to indicate that the container must participate in the atomic transaction and the value of the second transaction object is not null.

17. The computer readable storage medium of claim 16, further comprising instructions for verifying that at least one connection object that one or more of the plurality of workflow steps and the container communicate with during execution of the workflow can support the atomic transaction.

18. The computer readable storage medium of claim 16 wherein the transaction option property is set to indicate that the container must participate in the atomic transaction.

19. The computer readable storage medium of claim 18, further comprising instructions for assigning the atomic transaction to the container.

20. The computer readable storage medium of claim 16, further comprising instructions for assigning the value of the second transaction object to the value of the first transaction object if (1) the at least one property is set to indicate that the container must participate in the atomic transaction and (2) the value of the second transaction object is not null.

* * * * *

UNITED STATES PATENT AND TRADEMARK OFFICE
CERTIFICATE OF CORRECTION

| | | |
|---|---|---|
| PATENT NO. | : 7,603,363 B2 | Page 1 of 1 |
| APPLICATION NO. | : 11/030039 | |
| DATED | : October 13, 2009 | |
| INVENTOR(S) | : J. Kirk Haselden et al. | |

It is certified that error appears in the above-identified patent and that said Letters Patent is hereby corrected as shown below:

IN THE CLAIMS:

In column 12, line 53, In Claim 1, delete "participate" and insert -- participates --, therefor.

In column 13, line 67, In Claim 7, delete "participate" and insert -- participates --, therefor.

In column 15, line 29, In Claim 16, delete "participate" and insert -- participates --, therefor.

In column 16, line 8, In Claim 16, delete "memory;" and insert -- medium; --, therefor.

Signed and Sealed this
First Day of February, 2011

David J. Kappos
*Director of the United States Patent and Trademark Office*